United States Patent Office 2,736,892
Patented Feb. 28, 1956

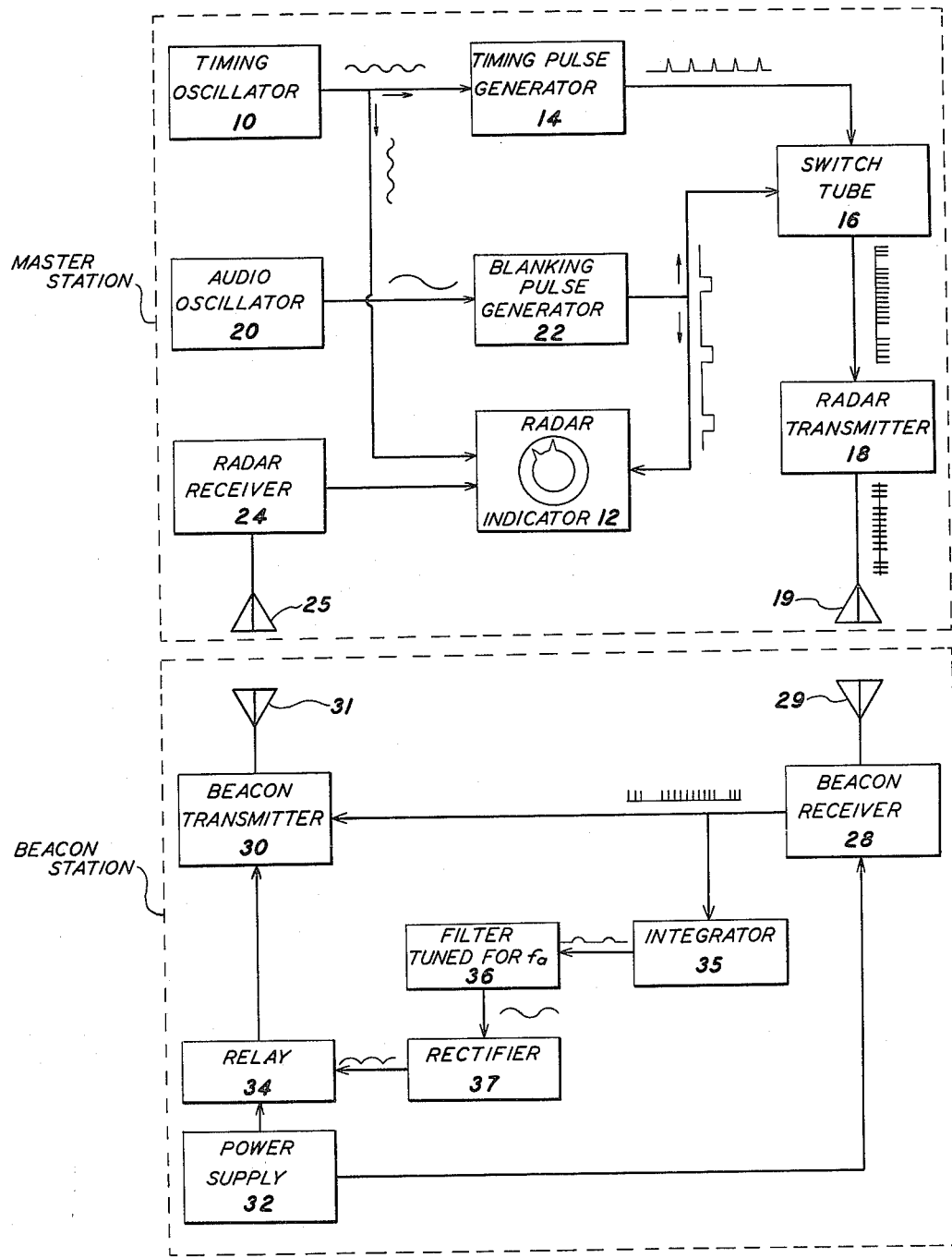

2,736,892

ECHO RANGING

Robert B. Moran, Jr., Pasadena, Calif., assignor to Moran Instrument Corporation, Pasadena, Calif., a corporation of California Application December 14, 1950, Serial No. 200,737

11 Claims. (Cl. 343—13)

This invention is concerned with echo ranging and particularly with the measurement of distance by determining the time required for transmission and return of a signal from its point of origin to and from an echoing device. The invention is described herein with particular reference to R. F. waves. However, it is also applicable in a variety of fields since the signal or pulse, which is the basis of the measurement, may be a radiated one, for example an R. F. pulse or a light pulse, or it may be an elastic wave, say a supersonic signal.

It has been proposed heretofore to measure the distance between two widely separated points by transmitting a pulse from one of the points to the other, receiving and retransmitting (transponding) the pulse at the other point back to the point of origin, receiving the transmitted pulse at the point of origin and determining the travel time of the pulse for the round trip. The distance between the two points may then be determined as being equal to the travel time of the pulse minus the delay in retransmission, if any, multiplied by half the velocity of the particular type of pulse in the medium through which it was transmitted.

In radar ranging systems of this type it is the general practice to employ a plurality of so-called "beacon" or slave stations at fixed known locations and a movable master station capable of measuring the distance from the master station to any one of the beacon stations by transmission of a signal to the beacon station and retransmission from the beacon station to the master station. To locate the master station on the earth's surface the distance between the master station and two or more of the beacon stations is determined in this manner. Three dimensional location of the master station requires three or more beacon stations. The position of the master station is then ascertainable by triangulation. To distinguish one beacon station from another when a retransmitted pulse is received at the master station, it has been the practice to tune each beacon station receiver to a different radio frequency and to transmit from the master station at staggered intervals, signals of the different frequencies characteristic of the different beacon stations. This expedient unduly complicates the master transmitter equipment and is wasteful of radio frequency channels.

It has sometimes been the practice, as a means for accomplishing this same end, to code the signal sent out by the master transmitter to a group of pulses whose duration or spacing are arranged according to predetermined patterns to one of which each beacon station is separately receptive. This expedient is only practical in long range equipment where low repetition rates are used and involves undesirable complexity in both the master and the beacon station equipment. Such practice is wasteful of power since only the last pulse in each group is used for range. Also an undesirably long delay (equal to the length of the pulse group) is introduced at the beacon for each round trip.

I have developed a system of echo ranging by means of which any desired beacon station may be interrogated at the will of the operator and which is adapted to any repetition rate. As a result of this latter feature the system of the invention is applicable to short range, low powered equipment having a very high repetition rate. In echo ranging involving the measurement of distance between a transmitter-receiver and a transponder by determining the travel time of a radiated pulse from transmitter to transponder and return, the instant invention contemplates improvements which comprise periodically interrupting pulse radiation from the transmitter and transponding only the received pulses which are interrupted at a particular frequency. The beacon station may include a tunable filter, such as a tuned amplifier or a simple filter network, to achieve the transponding selectivity.

A feature of the invention is that selectivity is determined solely by the frequency of pulse interruption and is independent of the duration of such interruption. By selecting an interruption or blanking frequency well below pulse repetition rate, as for example by interrupting the signal at an audio frequency, and by minimizing the duration of the blanking periods, the average power transmitted is not significantly reduced. In addition, the same large differential between signal repetition frequency and blanking frequency, enables the present system to be used with short range, low powered equipment where a high repetition rate is desirable.

As indicated above, the invention is applicable in measurement of distances employing radiated pulses such as those of radio frequency and those having the frequency of light transmitted at a preselected repetition rate. Pulses of this nature, as indicated above, are preferably interrupted at an appreciably lower frequency, say an audio frequency rate, and each transponder is tuned to trigger at a different interruption frequency so as to retransmit only its characteristic or triggering pattern. In addition, the invention is applicable in a process employing pulses of an elastic wave such as supersonic pulses. As applied to land surveying, the measurement of height above ground from an airplane, and the like, the use of radio pulses is preferred. For underwater measurement supersonic pulses may be employed.

In terms of apparatus my invention contemplates echo ranging equipment including signal originating means, means located at a distance from the signal originating means for transponding the signal, a signal registration means located adjacent the signal originating means, means forming a part of the signal originating means to periodically interrupt the signal therefrom at a predetermined frequency appreciably lower than the repetition frequency of the signal, and means associated with the means for transponding the signal to energize the transponder-transmitter responsive only to receipt of a signal interrupted at said predetermined frequency.

In one aspect the apparatus consists of a radar transmitter having a switch tube interposed between a radar pulse generator and a transmitter and actuated responsive to the output of a relatively low frequency oscillator to periodically blank the pulse train delivered from the pulse generator to the transmitter. A receiving or beacon station located at a distance from the transmitting station includes a receiver, a transmitter, a tuned filter or tuned amplifier and means operable responsive to passage of a signal through the tuned filter or tuned amplifier to activate the transmitter. In this fashion all the pulses delivered by the master station are received by the beacon station, but only a signal which is blanked or interrupted at a frequency to which the beacon station filter or amplifier is tuned will be retransmitted by the beacon station. If two or more beacon stations are employed each has a filter which is tuned to a different frequency and the particular beacon station to be interrogated is selected by merely varying the blanking frequency at the transmitter station.

It should be emphasized that the transmitted pulse is not modulated nor is the pulse pattern varied in frequency or duration. Either of these expedients is costly both in equipment and in loss of energy. Rather, the uniform pattern of high frequency pulses is periodically blanked or gated at a frequency which can be made very low compared to the repetition frequency of the pulses. Moreover, the blanking gate may be made short so that only one or two pulses are skipped during each blanking period. For this reason the average power transmitted by the radar is not appreciably reduced and the equipment is therefore of minimum complexity and size.

The invention will be more clearly understood by reference to the following detailed description taken in conjunction with the drawing which is a block diagram of a master station and an associated beacon station or transponder in accordance with the invention.

The illustrated master station includes a timing oscillator 10 (say a crystal oscillator operating at about 100 kc.). This oscillator operates continuously and provides the basic time standard for the system. Its output is in the form of a sine wave, as illustrated, and is employed to drive a radar indicator 12 which may be a "J" type cathode ray tube indicator commonly employed in radar systems.

The timing oscillator 10 is also employed to drive pulse generator 14 which produces one trigger pulse for each cycle of base frequency, the type of pulse being indicated diagrammatically adjacent the output of the generator. The trigger pulses thus generated are fed through an electronic switch 16, the pulses passing through the switch 16 being fed to a radar transmitter 18 which radiates a pulsed R. F. signal at the predetermined frequency through its antenna 19.

An audio oscillator 20 is connected to deliver a signal to a blanking pulse generator 22, the signal being in the form of a sine wave and at a frequency appreciably below the output of timing oscillator 10. The ratio of the output signals of the timing oscillator and audio oscillator may be as high as a thousand to one. In the blanking pulse generator the output of the audio oscillator is used to produce square pulses of uniform duration and at a repetition rate corresponding to the frequency setting of the audio oscillator. This blanking pulse generator is conveniently a single shot multivibrator adapted to deliver an output signal of the type illustrated. The function of the audio oscillator may be performed by other means, as for example a frequency divider network or counting chain operable in conjunction with the timing oscillator to develop a pulse at a sub-multiple of the timing frequency.

The pulse output of the blanking pulse generator is fed to the switch tube 16 to cut off the tube so that no timing pulses will pass through the tube during a blanking pulse. At the same time the blanking pulse is fed to indicator 12 so that no trace will be observed during the blanking periods.

With this arrangement the master station transmits a series of R. F. pulses at a repetition rate of 100 kc. and interrupted at an audio frequency rate which is variable and determined by the setting of the audio oscillator 20. The master station is completed by a receiver 24 having an antenna 25 and connected to receive and pass pulses into the indicator 12.

The beacon station, also shown in the drawing, includes a receiver 28 having an antenna 29 and adapted to receive the radiated signal from the master station transmitting antenna 19. The receiver 28 in the beacon station is continuously energized and picks up all signals transmitted from the master station regardless of interruption or blanking frequency. The receiver is directly connected to a transmitter 30 and continuously feeds the received signal to the transmitter. The transmitter has an antenna 31, the signals transmitted from the antenna 31 being picked up at antenna 25 of the master station. The beacon station transmitter 30 is driven by a power supply 32 connected to the beacon transmitter through a relay 34, the transmitter being operable to transmit the signals received from the receiver 28 only during periods in which the relay 34 is energized to pass power from the supply to the transmitter. This relay is connected to the beacon station receiver through an integrator 35, filter 36 and rectifier 37, the energy to actuate the relay being obtained or controlled by the received interruptions in the signal from the receiver.

In the integrator the received signal is integrated to form a pulse signal as illustrated adjacent the integrator output, and representing substantially a rounded-off version of the blanking pulse pattern developed at the blanking pulse generator 22 in the master station. The output of the integrator is fed into the filter 36 which is tuned at a particular frequency and which passes a signal substantially of sine wave form to rectifier 37 only upon receipt from the integrator of a signal, the frequency of which matches the tuned frequency of the filter. It is understood that the action of the integrator 35 and the filter 36 and also the rectifier 37 can be combined in a tuned amplifier in practice. These units are shown in separate blocks merely for simplifying the explanation. When such conditions exist, the output signal of the filter is rectified in rectifier 37 and is applied to energize relay 34. If desired the relay can be replaced with an electronic switch tube or any other means of energizing and de-energizing the transmitter in response to the presence or absence of an electrical signal.

Under these circumstances the beacon station transmitter 30 is activated by connection through relay 34 to the power supply, and the received signal at the beacon station is retransmitted by the beacon transmitter for reception at the master station receiver. The time interval for transmission of the signal from the master station to the beacon station and retransmission from the beacon station to the master station is determined by the radar indicator 12 which is generally calibrated to read in terms of distance, taking into account the velocity of the propagated signal and the fact that its travel is to and from the object whose distance from the master station is to be measured, i. e. the beacon station. The beacon station illustrated in the drawing will transmit only when a signal is received from the master station which has an interruption frequency matching the tuned frequency of filter 36. If other beacon stations are simultaneously in use they are tuned respectively to different frequencies differing from the tuned frequency of the illustrated beacon station. To determine the distance of the master station from each beacon station successively, the operator at the master station need only successively vary he frequency of audio oscillator 20 to match the frequencies of the several beacon station filters.

In the beacon station the receiver is always energized, hence receiving at all times the transmitted signal from the master station and feeding the signal directly to the beacon transmitter. Hence the moment the frequency of the audio oscillator 20 in the master station is adjusted or set at the frequency to which the beacon station filter is tuned, the beacon transmitter will be energized to retransmit this signal back to the master station. Selection is accomplished in accordance with the invention by periodic interruption of pulse transmission from the master station, which interruption may be at a frequency rate well below the pulse frequency, and the duration of the interruption may be equal to only a single pulse. The power requirements of the master station are held to a minimum, being in essence no greater than that required to transmit a single pulse over the same distance. Moreover, since there is no modulation or alteration of the radar pulse required, none of the generally complex equipment is required for accomplishing this purpose. The pattern to which the beacon stations are selective is accomplished in the present invention by means considerably less complicated than those required to modulate the transmitted pulse and involving essentially only a switch to momentarily and periodically interrupt the transmitted pulse.

It should be noted that there need be no integral relationship between the pulse repetition rate and the interruption frequency; therefore no counting means need be employed which would cause certain timing pulses to periodically be skipped. If, however, for any reason an integral relationship is desired between the interruption frequency and the pulse repetition rate, it may easily be obtained within the scope of this invention by merely feeding the timing frequency from the timing oscillator 10 or the pulse generator 14 into the audio oscillator 20 in such a way that the oscillator would lock on a selected sub-multiple of the timing frequency. Or the audio oscillator can be replaced by a frequency divider or counting chain whose output is an adjustable sub-multiple of the timing frequency.

The pulse signals which appear between the timing pulse generator 14 and the switch tube 16, and between the switch tube 16 and the radar transmitter 13, and between the beacon receiver 28 and the beacon transmitter 30 all have the same basic repetition rate. The pulses between the timing pulse generator 14 and the switch tube 16 are illustrated as being more widely spaced than the other pulses in order to show the wave form of the pulses.

I claim:

1. In echo ranging equipment including a master transmitter for radiating pulses at a predetermined repetition frequency, a transponder located at a distance from said master transmitter and including a receiver and slave transmitter for transponding radiated pulses, and registration means associated with said master transmitter for transponded pulses, the combination comprising means forming a part of said master transmitter to interrupt the pulses at a predetermined frequency which is less than the repetition frequency of the pulses, and means associated with said transponder to activate said slave transmitter responsive to and to transpond only received radiation interrupted at a predetermined frequency.

2. Apparatus according to claim 1 wherein said means to interrupt pulse radiation comprises a switch tube connected to pass pulses to said transmitter, an oscillator, and means connected to gate the switch tube once for each cycle of said oscillator.

3. Apparatus according to claim 1 wherein said transponder comprises a receiver, a transmitter connected to the receiver, a power supply connected to energize the receiver, gate means, means connecting the power supply to the transmitter through said gate means, and means energizing the gate means to pass power to the transmitter responsive to received pulsed signals blanked at a given frequency.

4. In echo ranging equipment including a master transmitter for radiating pulses at a predetermined repetition rate, a transponder located at a distance from said master transmitter and including a receiver and slave transmitter for transponding R. F. pulses, and registration means associated with said first transmitter for transponded pulses, the combination comprising means forming a part of said master transmitter to interrupt pulse radiation therefrom at an audio frequency rate, and means associated with said transponder to activate said slave transmitter responsive to and to transpond only received radiation interrupted at a predetermined audio frequency.

5. Apparatus according to claim 4 wherein said means to activate said second transmitter comprises a power supply, a relay, and a tuned circuit, the power supply being connected directly to said receiver and through said relay to the transmitter, and the receiver being connected directly to said transmitter and through said tuned circuit to the relay, the arrangement being such that all received signals are passed to said transmitter but only a signal blanked at the tuned frequency of said tuned circuit will function to energize the relay and actuate the transmitter.

6. In echo ranging equipment including a master transmitter for radiating pulses at a predetermined repetition rate, a plurality of spaced transponders located at a distance from said master transmitter and each including a receiver and slave transmitter for transponding radiated pulses, and registration means associated with said master transmitter for transponded pulses, the combination comprising means forming a part of said master transmitter to blank pulse radiation therefrom at different audio frequencies, and means associated with each transponder to activate its slave transmitter responsive to and to transpond only received radiation blanked at a predetermined characteristic frequency different from the characteristic frequency of other transponders.

7. In echo ranging apparatus for effecting the measurement of distance between a transmitter-receiver and a transponder by determining the travel time of pulses which are radiated at a predetermined repetition rate from the transmitter to the transponder and return, the improvement which comprises means for periodically interrupting pulse radiation from the transmitter so that the time occupied by the interruptions is small compared to the time during which pulses are transmitted, and means for transponding only those received pulses which are interrupted at a particular frequency.

8. In echo ranging equipment including a master transmitter for radiating pulses at a predetermined frequency, a transponder located at a distance from the master transmitter and including a receiver and slave transmitter for transponding radiated pulses, and registration means associated with the master transmitter for transponded pulses, the combination comprising means forming a part of the master transmitter to periodically interrupt pulse transmission at a frequency which is less than the pulse repetition frequency, and means associated with the transponder to actuate the slave transmitter responsive to received pulses interrupted at a predetermined frequency to transpond all of the transmitted pulses which are interrupted at the particular frequency.

9. Echo ranging apparatus for effecting measurement of distance comprising a transmitter for radiating pulses at a predetermined repetition rate, means for interrupting pulse radiation by the transmitter at a predetermined rate which is less than the repetition rate of the pulses, a transponder spaced from the transmitter and having a circuit which is responsive only to a particular frequency at which pulses may be interrupted for causing the transponder to transpond substantially all of the pulses which are interrupted at said predetermined rate, and a receiver located adjacent the transmitter for receiving the transponded pulses and for providing an indication of the time required for the respective pulses to travel from the transmitter to the transponder and return to the receiver, whereby substantially all of the transmitted pulses are transponded and employed at the receiver for providing an indication of the travel time.

10. Echo ranging apparatus for effecting measurement of distance comprising a transmitter for radiating pulses at a predetermined repetition rate, means for interrupting pulse radiation by the transmitter at an audio frequency to cause the time occupied by the interruptions to be small compared to the time during which pulses are transmitted, a transponder spaced from the transmitter and having a tuned circuit which is responsive only to a particular frequency at which pulses may be interrupted for activating the transponder in response to pulses which are interrupted at that particular frequency, and a receiver located adjacent the transmitter for receiving the transponded pulses and for providing an indication of the time required for the pulses to travel from the transmitter to the transponder and return to the receiver.

11. Echo ranging apparatus comprising a transmitter for radiating pulses at a predetermined repetition rate, means for interrupting pulse radiation by the transmitter at a predetermined rate which is many times less than the repetition rate of the pulses, a transponder spaced from the transmitter for transponding only the pulses which are interrupted at a particular rate, and means located adjacent the transmitter for receiving the transponded pulses.

References Cited in the file of this patent

UNITED STATES PATENTS

| | | |
|---|---|---|
| 2,237,193 | Mobsby | Apr. 1, 1941 |
| 2,415,359 | Loughlin | Feb. 4, 1947 |
| 2,415,918 | Thomas | Feb. 18, 1947 |
| 2,425,316 | Dow | Aug. 12, 1947 |
| 2,444,426 | Busignies | July 6, 1948 |
| 2,531,412 | Deloraine | Nov. 28, 1950 |
| 2,548,813 | Perkins et al. | Apr. 10, 1951 |
| 2,554,893 | Brunn | May 29, 1951 |